(12) United States Patent
Banga et al.

(10) Patent No.: US 12,098,973 B2
(45) Date of Patent: Sep. 24, 2024

(54) SYSTEMS AND METHODS FOR AN INTEGRATED HOSE ASSEMBLY

(71) Applicant: ContiTech USA, Inc., Fairlawn, OH (US)

(72) Inventors: Cameron Banga, Valparaiso, IN (US); Jaroslaw Zakrzewski, Wadsworth, OH (US); Michael Wilder, Valparaiso, IN (US); Dustin Kendall, Marysville, TN (US)

(73) Assignee: ContiTech USA, Inc., Fairlawn, OH (US)

( * ) Notice: Subject to any disclaimer, the term of this patent is extended or adjusted under 35 U.S.C. 154(b) by 642 days.

(21) Appl. No.: 17/249,387

(22) Filed: Mar. 1, 2021

(65) Prior Publication Data

US 2022/0276112 A1 Sep. 1, 2022

(51) Int. Cl.
*G01M 3/02* (2006.01)
*G06F 16/245* (2019.01)
*G06K 7/10* (2006.01)

(52) U.S. Cl.
CPC ............. *G01M 3/02* (2013.01); *G06F 16/245* (2019.01); *G06K 7/10366* (2013.01)

(58) Field of Classification Search
None
See application file for complete search history.

(56) References Cited

U.S. PATENT DOCUMENTS

| | | | |
|---|---|---|---|
| 4,302,960 A | 12/1981 | Leiker | |
| 4,804,212 A | 2/1989 | Vyse | |
| 5,799,383 A * | 9/1998 | Baldwin | ............... B25B 27/10 29/516 |
| 6,715,335 B2 | 4/2004 | Huebner et al. | |
| 8,888,140 B2 | 11/2014 | Stroempl et al. | |
| 10,443,771 B2 | 10/2019 | Intagliata et al. | |
| 2005/0199700 A1* | 9/2005 | Baker | ................... G06Q 10/06 257/679 |
| 2007/0060791 A1 | 3/2007 | Kubach | |
| 2008/0059082 A1 | 3/2008 | Morrison | |

(Continued)

OTHER PUBLICATIONS

International Search Report dated Jun. 3, 2022 of International Application PCT/US2022/070691 which claimed priority of this application.

*Primary Examiner* — Roy Y Yi
(74) *Attorney, Agent, or Firm* — Gregory J. Adams; Richard A. Wolf

(57) ABSTRACT

A testbench system 210, 206 for analyzing hose assemblies 204 is disclosed. The testbench system 210, 206 includes a network interface 308 and a memory storage 310. The testbench also includes and one or more processors 312 configured to: obtain a unique assembly identification (UAID) for a hose assembly, reference a database 162 using the UAID to obtain hose usage information and hose characteristics for the hose assembly 204, perform one or more tests on the hose assembly based on the hose characteristics and generate test results, determine whether the hose assembly 204 meets one or more thresholds based on the test results, and generate a pass/fail message based on whether the determination of whether the hose assembly meets the one or more thresholds, and transfer the pass/fail message to the network interface 308.

20 Claims, 6 Drawing Sheets

(56) References Cited

U.S. PATENT DOCUMENTS

2015/0381368 A1* 12/2015 Stevens, Jr. ............ G06Q 30/04
                                                          705/40
2016/0300195 A1* 10/2016 Harvey .................. G06Q 10/20
2020/0114413 A1   4/2020 Thompson et al.
2020/0250358 A1   8/2020 McGrath et al.

* cited by examiner

SYSTEMS AND METHODS FOR AN INTEGRATED HOSE ASSEMBLY

FIELD

The disclosure generally relates to systems and methods for hose assembly and identification.

BACKGROUND

Industrial hoses are commonly used to transport hydraulic fluid, fluid, gas, solid, food, beverage, steam, petroleum, chemicals, gasses, and air. Additionally, these hoses are typically assembled with fittings to facilitate connection to vessels, other hoses, systems, tanks, tankers, other hoses, platforms and the like.

Hoses are typically assembled by crimping or attaching a fitting to an end of hose. This includes selecting a fitting and then attaching that fitting.

What is needed are techniques to facilitate fitting and hose assembly and use of hose crimping machines.

DETAILED DESCRIPTION

Figure 1A:
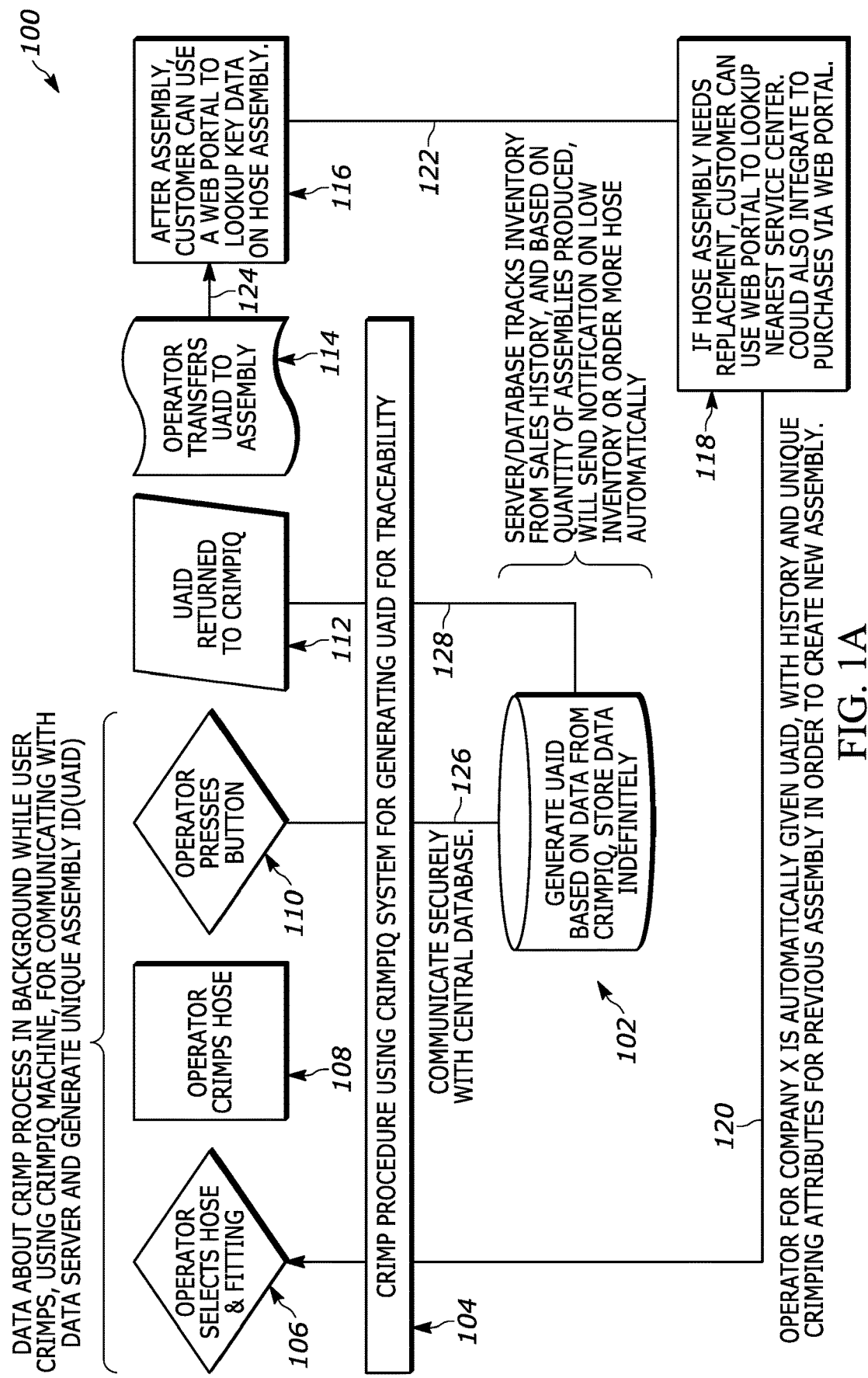
FIG. 1A is a diagram illustrating a method 100 for hose assembly and identification in accordance with one or more embodiments amend the claims without prejudice.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Industrial hoses are commonly used to transport hydraulic fluid, fluid, gas, solid, food, beverage, steam, petroleum, chemicals, gasses, and air. Additionally, these hoses are typically assembled with fittings to facilitate connection to vessels, other hoses, systems, tanks, tankers, other hoses, platforms and the like.

Hoses are typically assembled by crimping or attaching a fitting to an end of hose using crimp parameters, such as crimping force, pressure and the like.

One technique to obtain crimp parameters is to use a reference book. The reference book may be referenced based on hose material, hose size, and fitting type. This technique for assembly is only based on the hose and the fitting to be assembled.

Hoses, fittings and assembled hoses are used for/in a variety of conditions, uses or applications and the like. For example, a hose of one material may be used for petroleum whereas another hose of the same material is used for hot gases.

Additionally, hoses, fittings and assembled hoses have lifespans that can vary based on the use conditions and/or applications. For example, a hose used in extreme heat for a year will have a lower remaining lifespan the a similar hose used in moderate conditions.

One problem is that, once used, the lifespan of a hose is difficult to determine.

Another problem is that the crimping process does not consider environmental conditions and/or applications of the hoses.

Embodiments are disclosed that facilitate crimping by referencing a central database to determine crimp parameters, test assembled hoses at and after fabrication, track usage of hoses, and determine lifespan of hoses.

FIG. 1A is a diagram illustrating a method 100 for hose assembly and identification in accordance with one or more embodiments. It is appreciated that the method 100 is provided for illustrative purposes and that suitable variations are contemplated.

Figure 2:
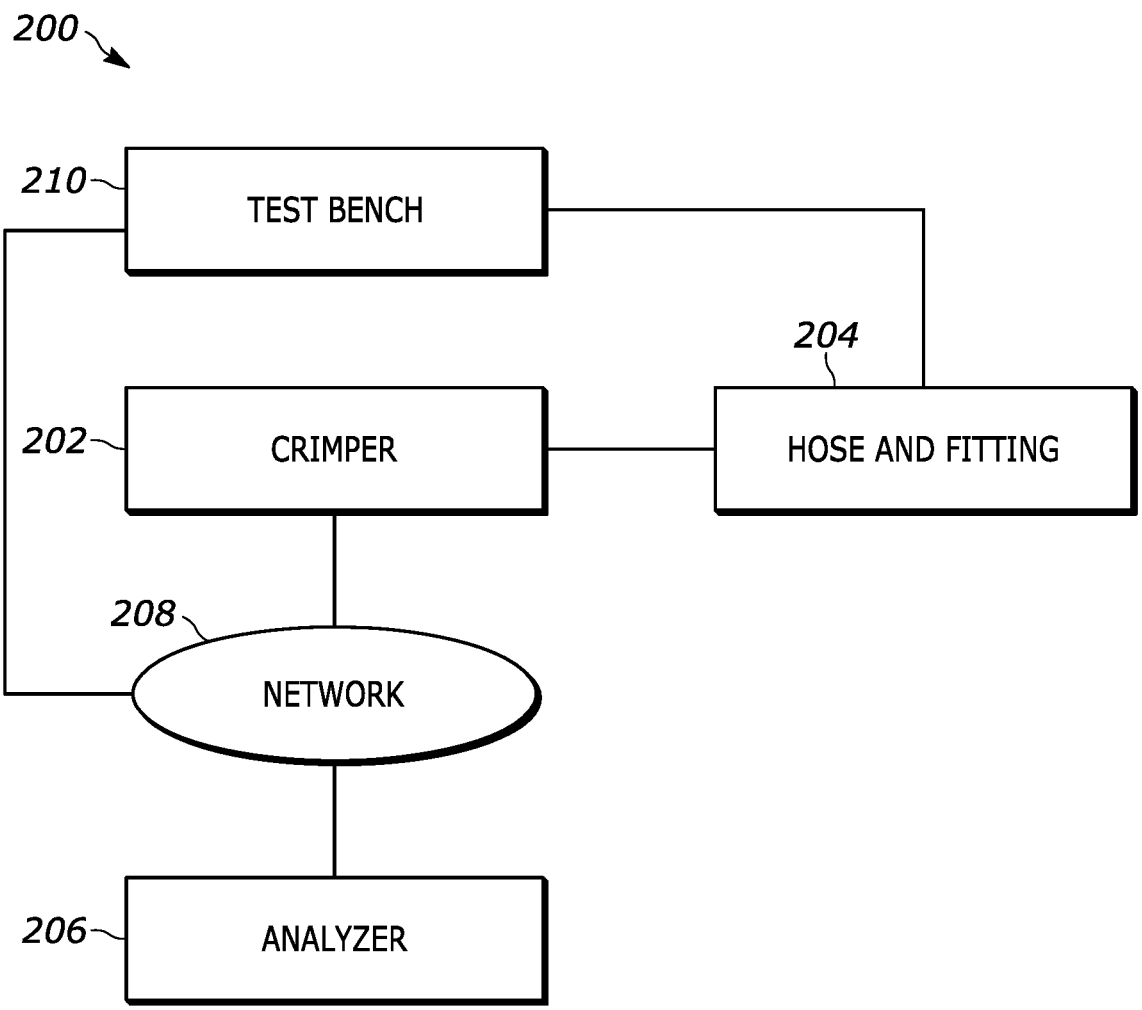
FIG. 2 is a diagram illustrating a system 200 for assembling a hose and fitting in accordance with one or more embodiments.

The method 100 operates using a hose assembly system 200, which includes a crimper 202 and/or testbench 210 and an analyzer 206 and utilizes a network 208 to assemble a hose and fitting 204 as shown in FIG. 2.

An example of suitable operation of the system 200 is shown in FIG. 1 by the method 100. An order and flow are shown in FIG. 1 for illustrative purposes, however it is appreciated that the method 100 can operate with suitable variations.

A unique assembly identification (UAID) is generated at 102. The UAID is generated based on data/information from the crimper or crimp controller 202. The crimper 202 stores the data in a server or central database. The data include crimping parameters, such as pressure, central position and the like.

In one example, the crimper or crimp controller 202 is a CrimpIQ controller by Continental. The CrimpIQ controller is a controller for distributors and customers in the hydraulic and industrial hose markets. The CrimpIQ controller enables instantaneous updates to the crimper thereby reducing costly downtime and offering a new level of enhanced efficiency, safety, quality and speed to our customers operations. Crimpers equipped with CrimpIQ controllers can provide instantaneous maintenance information and updates for users who crimp hydraulic and industrial hose.

The CrimpIQ controller designed to provide remote maintenance and updates, uses Cloud-based technology, and is for crimping hydraulic and industrial hose assemblies. The monitoring process can be entirely cloud-based.

A crimping procedure is designed at 104 using the crimping parameters. The crimper 202 can performing the crimping procedure to attach the hose and fitting 204. The crimper 202 can communicate with a central database using 126. Additionally, the server (analyzer 206) can track inventory at 128 from sales history and, based on quantity of assemblies produced, will send notification on low inventory and/or order additional hoses automatically.

An operator selects the hose and fitting 204 for assembly at 106.

The operator crimps the hose and fitting 204 together as an assembly at 108 using the crimper 202.

The operator presses a button at 110.

In response to the event at 110, the UAID is generated and returned at 112.

The operator transfers the UAID to the hose and fitting 204 at 114, which is now assembled. In one example, the UAID is encoded in an RFID tag and attached to the hose. In another example, the UAID is printed on a label and attached to the hose.

A customer can use the UAID as a reference to lookup data on the hose assembly at 116.

The analyzer 206 is configured to track usage of the hose 204 at 118. The analyzer 206 is also configured to determine if the hose needs replacement and/or serviced. Further, the analyzer 206 is configured to contact and/or identify a suitable service center.

It is appreciated that suitable variations of the method 100 are contemplated, including additional blocks and/or omission of shown blocks.

Figure 1B:
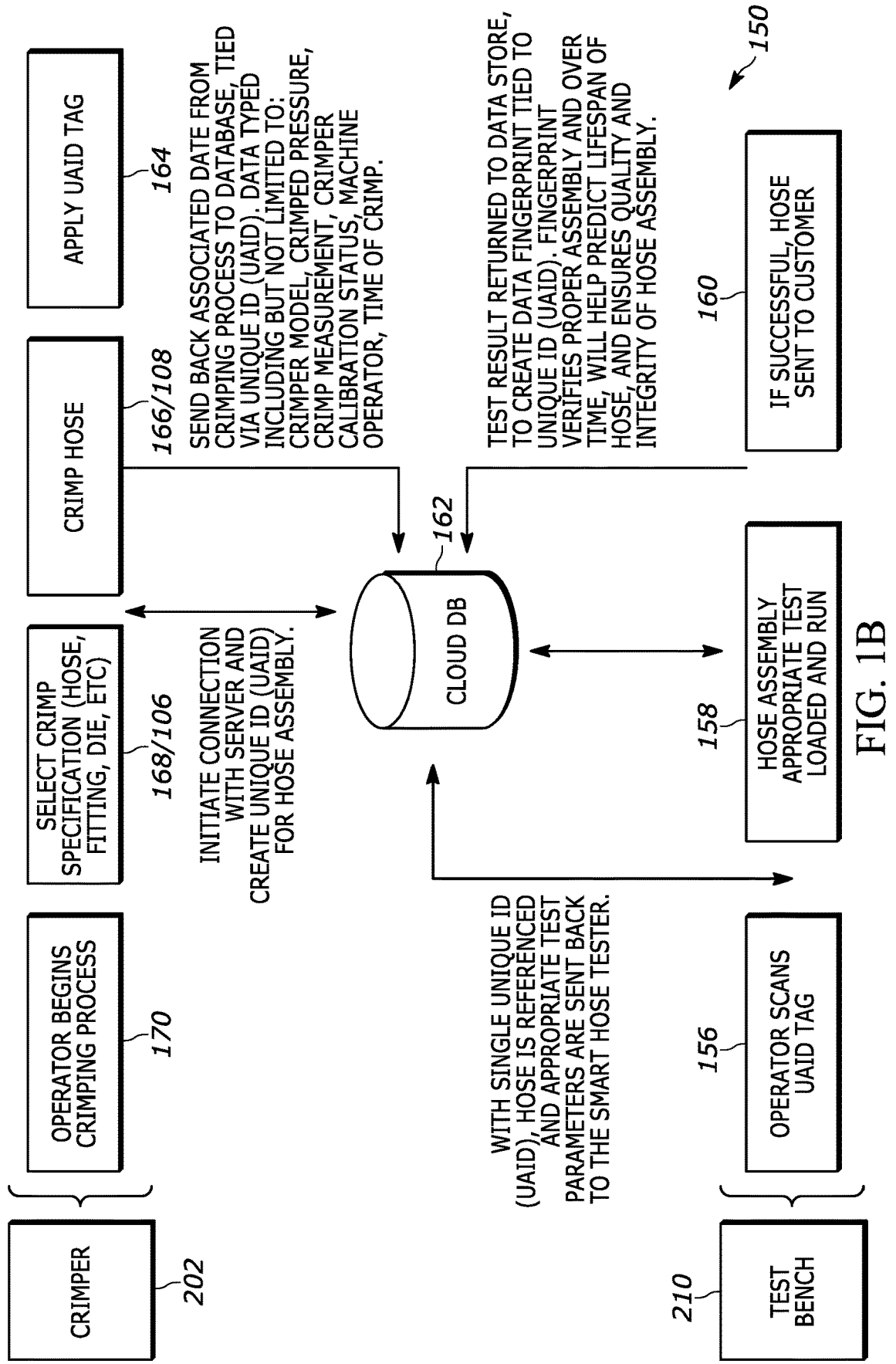
FIG. 1B is a diagram illustrating a method 150 for hose assembly and identification in accordance with one or more embodiments.

FIG. 1B is a diagram illustrating a method 150 for hose assembly and identification in accordance with one or more embodiments. It is appreciated that the method 100 is provided for illustrative purposes and that suitable variations are contemplated.

The method 150 operates using a hose assembly system 200, which includes a crimper 202, testbench 212 and an analyzer 206 and utilizes a network 208 to assemble a hose and fitting 204 as shown in FIG. 2.

An example of suitable operation of the system 200 is shown in FIG. 1B by the method 150. An order and flow are shown in FIG. 1B for illustrative purposes, however it is appreciated that the method 150 can operate with suitable variations.

An operator initiates or begins a crimping process for a hose and a fitting at 170.

Crimp specifications are for the crimping process are selected at 168, similar to the 106 of the method 100. A connection with a database or server 162 is established and a unique identification (UAID) is created or obtained for the hose assembly. Crimp parameters are provided from the server or database back to the crimper 202.

The fitting is crimped to the hose at block 166, similar to the block 108 of the method 100.

The unique assembly identification (UAID) tag is applied to the assembly at block 164.

Blocks 156, 158 and 160 are typically performed by the test bench 210. The assembly is produced by the blocks 170, 168, 166 and 164 and/or similar techniques.

An operator scans a UAID tag for an assembled fitting and hose, referred to as assembly, at block 156 using the test bench 210.

The assembly is tested using one or more performance tests at block 158. The performance tests include testing based on pressure, temperature, elasticity, and the like.

If the assembly passes the one or more tests, the assembly is shipped or transferred to a customer/entity at 160.

FIG. 2 is a diagram illustrating a system 200 for assembling and testing a hose and fitting in accordance with one or more embodiments. The system 200 is provided for illustrative purposes and it is appreciated that suitable variations of the system 200 are contemplated.

The system 200 includes a crimper or testbench 202, a hose 204, a testbench 210, an analyzer 206 and a network 208. The system 200 can be utilized to perform the method 100, described above.

The crimper 202 is generally configured to perform hose assembly by crimping the hose 204 to a selected fitting. The crimper 202 can be configured by an operator and can receive or input hose specifications and fitting specifications. The crimper 202 receives crimp parameters from the analyzer 206 and uses the received crimp parameters to perform the hose assembly. The crimper 202 monitors and measures the crimping process and provides measured data to the analyzer for the hose assembly. Post crimping, the crimper 202 tags the hose 204 with a unique assembly identification (UAID).

The crimp parameters can include diameters, die sizes, die types, force, duration and the like.

A testbench 210 can be used to perform hose assembly and testing of the hose 204. For example, the testbench 210 can be configured to perform a high pressure test at a multiple of an operating pressure for the hose to test for leaking, rupture of the hose, and the like.

The testbench 210 can provide the test results to the analyzer 206.

The analyzer 206 is configured to generate the crimp parameters based on the hose specifications and the fitting specifications and operational data. The operational data can include measurements from prior hose assembly operations, force used, crimp duration, pressure tests, test results from the testbench 210 and the like. The crimper analyzer 206 is configured to update the operational data with the provided measured data from the crimper and the test results from the testbench 210.

Additionally, the analyzer 206 is configured to generate the UAID for the hose 204.

The analyzer 206 is also configured to track usage information for the hose. This usage information can include geographic location, environmental conditions and the like. Further, the crimper analyzer 206 is configured to determine potential failures and maintenance for the hose 204.

The analyzer 206 is further configured to analyze the test results from the testbench 210 and determine one or more hose assembly properties including lifespan, pass/fail and the like.

In one example, the analyzer determines the pass/fail of the hose assembly based on the tests results and whether the test results meet one or more thresholds. For example, a threshold includes an allowed elongation or stretching at a selected pressure. If the hose material expands greater than the allowed amount at the selected pressure, the hose assembly fails in this example.

For example, the analyzer 206 can evaluate the environmental conditions and time of use for a hose along with the test results to determine a lifespan for a hose.

In another example, the analyzer 206 evaluates the test results for a hose and compares the test results with one or more threshold values (pressure, strain, and the like). If the test results exceed the threshold values, the hose is identified as unacceptable. If the test results are below the threshold values, the hose is identified as acceptable (the hose passed) and the hose can be shipped to a customer. A database of the network 208 can be updated with the evaluation using the UAID for the hose.

Additionally, the analyzer 206 can be incorporated into or part of the testbench 210, the crimper 202 and/or combinations thereof.

Figure 3:
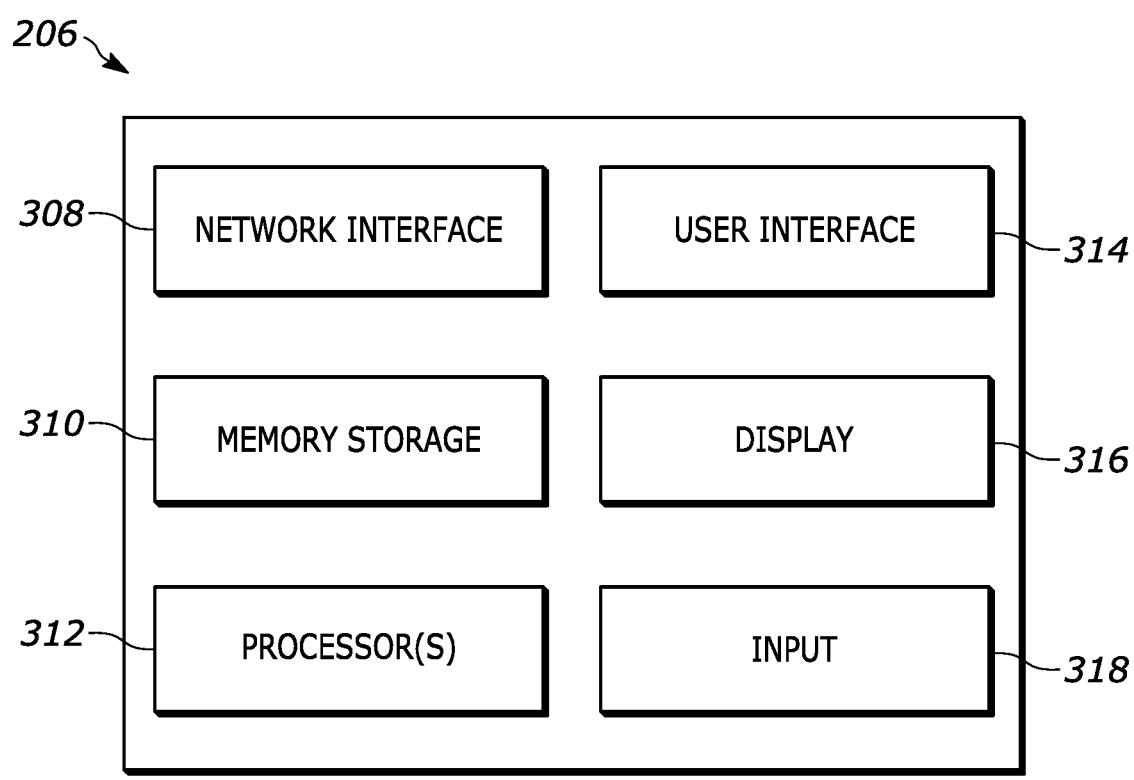
FIG. 3 is a diagram illustrating a crimper analyzer 206 in accordance with one or more embodiments.

FIG. 3 is a diagram illustrating an analyzer 206 in accordance with one or more embodiments. The analyzer 206 is depicted for illustrative purposes and it is appreciated that other elements/components are contemplated.

The analyzer 206 is shown with a network interface 308, a memory storage 310, one or more processors 312, a user interface 314, a display 316 and an input device 318.

The network interface 308 is an interface to a transmitter/receiver/transceiver and can be coupled to a network, such as a cloud network, 5G, 3G, the Internet, and the like.

The network interface 308 is configured to receive hose specifications and fitting specifications from the network 208.

Additionally, the network interface 308 is configured to receive test results from the network 208. The network interface 308 can be coupled to a transceiver (not shown) that receives information from the network 208 and provides information to the network 208.

The memory 310 can be a volatile and/or non-volatile memory.

The one or more processors 312 are configured to receive the hose specifications and fitting specifications from the network interface; generate crimp parameters based on the received hose specifications, the fitting specifications and/or crimp operation data; update the crimp operation data with additional crimp operation data; store the updated crimp operation data in the memory storage; and generate a unique assembly identification (UAID) for the hose assembly operation subsequent to the hose assembly operation.

The one or more processors 312 are also configured to receive the test results from a testbench and evaluate the test results. The one or more processors 312 are configured to determine lifespan based on the test results and usage information. The one or more processors are also configured to determine whether the associated hose meets one or more thresholds and determine whether the hose is acceptable for use or unacceptable.

The user interface 314 is connected to the processor 312, the memory storage 310 and/or the network interface 308. The user interface 314 can provide or display test results and the like. Additionally, the user interface 314 can receive input information related to the hose assembly, such as hose characteristics, fitting size and the like.

In one example, the user interface 314 includes the display 316 and the input device 318. The display 316 can provide the test results, analysis results, crimp parameters and the like. The input device 318 can be configured to initiate testing, select tests to perform, and input the information related to the hose assembly.

Figure 4:
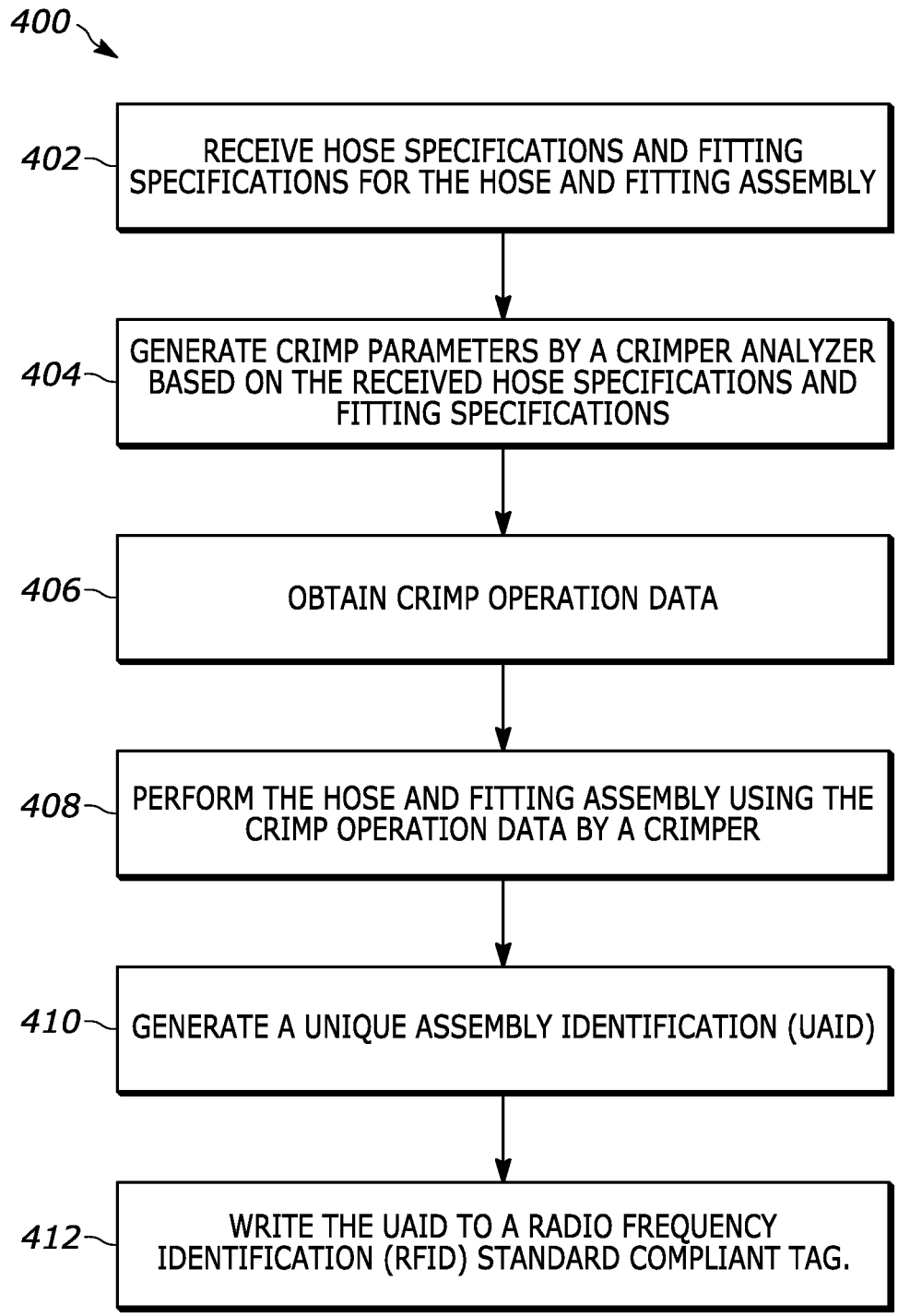
FIG. 4 is a flow diagram illustrating a method 400 of performing hose and fitting assembly in accordance with one or more embodiments.

FIG. 4 is a flow diagram illustrating a method 400 of performing hose and fitting assembly in accordance with one or more embodiments. It is appreciated that the method 400 can be performed in any suitable order and that additional elements can be included and/or shown elements omitted.

Hose specifications and fitting specifications for the hose and fitting assembly are received at 402 by a crimper analyzer.

The crimper analyzer generates crimp parameters based on the received hose specifications and fitting specifications at 404.

Crimp operation data is obtained by the analyzer from a crimper or testbench at 406.

The crimper or testbench performs the hose and fitting assembly using the crimp operation data from the crimper analyzer at 408.

The crimper or analyzer generates a unique assembly identification (UAID) at 410.

The UAID is written to a radio frequency identification (RFID) standard compliant tag or similar techniques, such as using automatic identification and data capture (AIDC), at 412.

In one variation of the method, the crimp parameters include a crimping force and the crimp operation data includes force applied during crimping and duration of crimping.

Figure 5:
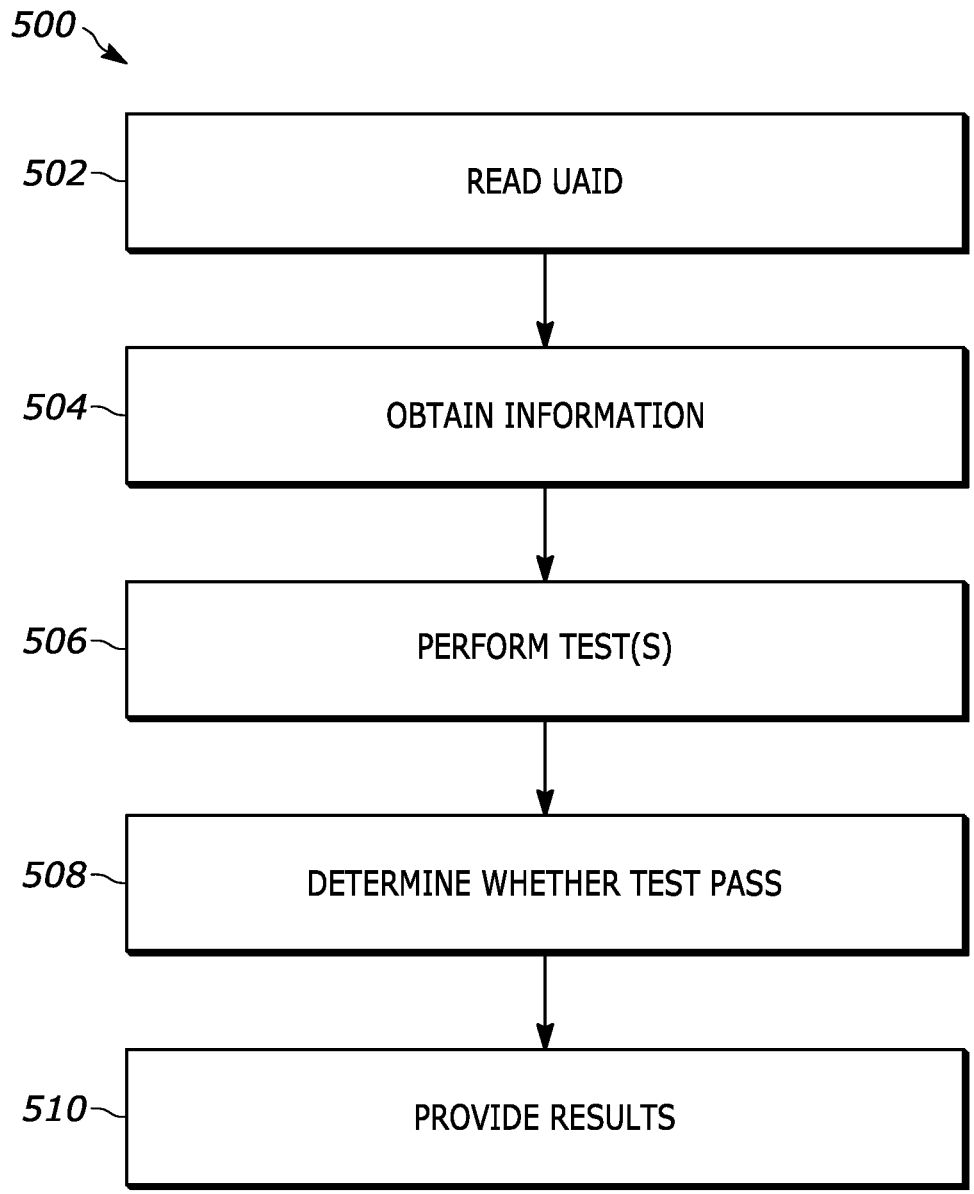
FIG. 5 is a flow diagram illustrating a method 500 of performing testing on hose and fitting assembly in accordance with one or more embodiments.

FIG. 5 is a flow diagram illustrating a method 500 of performing testing on hose and fitting assembly in accordance with one or more embodiments. It is appreciated that the method 500 can be performed in any suitable order and that additional elements can be included and/or shown elements omitted.

The method 500 can be performed using the system 200 and suitable variations thereof.

The method begins at block 502, where a testbench reads a unique assembly identification (UAID) for a hose assembly.

The testbench references a database with the UAID to obtain hose usage information and hose characteristics at block 504.

The testbench performs one or more tests on the hose assembly to generate test results at block 506.

The testbench determines whether the hose assembly meets one or more thresholds based on the test results at block 508.

The testbench provides the test results to the database at block 510.

It is noted that 'having' does not exclude other elements or steps and 'one' or 'one' does not exclude a multitude. It should also be noted that characteristics described with reference to one of the above examples of execution can also be used in combination with other characteristics of other examples of execution described above. Reference signs in the claims are not to be regarded as a restriction.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It is appreciated that the various aspects/embodiments can utilize short-range communication, such as near field communication (NFC). The NFC standard related to the radio-frequency identification (RFID) standard describes a communication protocol for transmitting information between two devices.

An RFID tag can be used, which includes a radio transponder; a radio receiver and transmitter. When triggered by an electromagnetic interrogation pulse from a nearby RFID reader device, the RFID tag transmits digital data, such as an identifying number, back to the reader. Passive RFID tags are powered by energy from the RFID reader's interrogating radio waves. Active RFID tags are powered by a battery and thus can be read at a greater range from the RFID reader; up to hundreds of meters. Unlike a barcode, the tag doesn't need to be within the line of sight of the reader, so it may be embedded in the tracked object. RFID is one method of automatic identification and data capture (AIDC). It is appreciated that the various aspects/embodiments can utilize RFID tags and/or other techniques of AIDC.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be added that 'having' does not exclude other elements or steps and 'one' or 'one' does not exclude a multitude. It should also be noted that characteristics described with reference to one of the above examples of execution can also be used in combination with other characteristics of other examples of execution described above. Reference signs in the claims are not to be regarded as a restriction.

Various examples are provided, however it is appreciated that suitable variations are contemplated.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus, system, and the like to perform the actions.

One general aspect includes a testbench system for analyzing hose assemblies. The testbench system includes a network interface and a memory storage. The testbench also includes and one or more processors configured to: obtain a unique assembly identification (UAID) for a hose assembly, reference a database using the UAID to obtain hose usage information and hose characteristics for the hose assembly, perform one or more tests on the hose assembly based on the hose characteristics and generate test results, determine whether the hose assembly meets one or more thresholds based on the test results, and generate a pass/fail message based on whether the determination of whether the hose assembly meets the one or more thresholds, and transfer the pass/fail message to the network interface.

Implementations may include one or more of the following features. The system where the hose characteristics include hose material, inner diameter, and outer diameter. The hose characteristics include fitting material and fitting outer diameter. The hose characteristics include crimp parameters utilized in the crimping of the hose assemble, the crimp parameters include crimp diameter, pressure data for crimp head, crimp head for position, physical hose properties, temperature, and pressure. The one or more processors are configured to receive location information for the hose assembly based on the UAID. The network interface is connected to a cloud network.

The system may include a manifold configured to attach the hose to the testbench during the testing procedure. The system may include a user interface coupled to the one or more processors. The system may include an input device and a display to the user interface. The one or more processors further configured to determine a remaining lifespan for the hose assembly based on the generated test results. The system the one or more processors further configured to determine a remaining lifespan for the hose assembly based on the generated test results and the obtained hose usage information. The system the hose usage information may include number of uses, durations of the uses, environmental conditions including temperature, and application information including pressure and stress.

The system may also include where the pass/fail message indicates that the hose assembly meets a selected specification. The system can include a transceiver configured to transmit the test results and the UAID to a cloud database and the cloud data database maintains the test results according to the UAID.

One general aspect includes a system for analyzing hose assemblies. The system also includes a database configured to store information for hose assemblies based on unique assembly identifications (UAIDs). The system also includes a crimper configured to obtain crimping parameters for a hose assembly from the database based on a unique assembly identification and perform assembly based on the obtained crimping parameters. The system also includes a testbench configured to read an RFID tag on the hose assembly to obtain the UAID, reference the database using the UAID to obtain hose usage information and hose characteristics for the hose assembly, perform one or more tests on the hose assembly based on the hose characteristics and generate test results, and determine whether the hose assembly meets one or more thresholds based on the test results.

Implementations may include one or more of the following features. The system the testbench further configured to generate a pass/fail message based on whether the determination of whether the hose assembly meets the one or more thresholds. The system the testbench further configured to determine a lifespan for the hose assembly based on the test result and to provide the determined lifespan to the database.

One general aspect includes a method of operating a testbench. The method of operating also includes referencing a database using a unique assembly identification (UAID) for a hose assembly to obtain hose usage information. The method of operating also includes performing a plurality of tests on the hose assembly to generate test results. The method of operating also includes providing the generated test results to the database.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A testbench system for analyzing hose assemblies, the system comprising:
a network interface;
a memory storage; and
one or more processors configured to:
read an identification tag referred to as a unique assembly identification (UAID) from a hose assembly using near field communication (NFC);
reference a database using the UAID to obtain hose usage information and hose characteristics for the hose assembly, the hose assembly comprising a crimp assembled fitting and hose;
select appropriate test parameters from the database using the UAID:
perform one or more tests on the hose assembly based on the hose characteristics using the selected appropriate test parameters and generate test results, the one or more tests including a pressure test and a strain test;
determine whether the hose assembly meets one or more thresholds based on the test results; and
generate an evaluation of the hose assembly based on the performed one or more tests and the obtained usage information and the obtained hose characteristics; and
generate fingerprint tied to the UAID that verifies proper assembly;
provide the evaluation to the network interface.

2. The system of claim 1, wherein the hose characteristics include hose material, inner diameter, and outer diameter.

3. The system of claim 1, wherein the hose characteristics include fitting material and fitting outer diameter.

4. The system of claim 1, wherein the hose characteristics include crimp parameters utilized in the crimping of the hose assemble, the crimp parameters include crimp diameter, pressure data for crimp head, crimp head for position, physical hose properties, temperature, and pressure.

5. The system of claim 1, wherein the one or more processors are configured to receive location information for the hose assembly based on the UAID.

6. The system of claim 1, further comprising a transceiver configured to transmit the pass/fail message.

7. The system of claim 6, wherein the pass/fail message indicates that the hose assembly meets a selected specification.

8. The system of claim 6, the transceiver configured to transmit the test results and the UAID to a cloud database and the cloud data database maintains the test results according to the UAID.

9. The system of claim 1, wherein the network interface is connected to a cloud network.

10. The system of claim 1, further comprising manifold configured to attach the hose to the testbench during the testing procedure.

11. The system of claim 1, further comprising a user interface coupled to the one or more processors and configured to permit entry of user input data for the hose assembly.

12. The system of claim 11, further comprising an input device and a display to the user interface.

13. The system of claim 1, the one or more processors further configured to determine a remaining lifespan for the hose assembly based on the generated test results.

14. The system of claim 1, the one or more processors further configured to determine a remaining lifespan for the hose assembly based on the generated test results and the obtained hose usage information.

15. The system of claim 14, the hose usage information comprises number of uses, durations of the uses, environmental conditions including temperature, and application information including pressure and stress.

16. A system for analyzing hose assemblies, the system comprising: a database configured to store information for hose assemblies based on unique assembly identifications (UAIDs); a crimper configured to obtain crimping parameters for a hose assembly from the database based on a unique assembly identification and perform assembly based on the obtained crimping parameter, the hose assembly comprising a crimp assembled fitting and hose;
a testbench configured to
read an RFID tag on the hose assembly to obtain the UAID;
reference the database using the UAID to obtain hose usage information and hose characteristics for the hose assembly, the usage information comprising duration of use;
perform one or more tests on the hose assembly based on the hose characteristics and generate test results; and
determine whether the hose assembly meets one or more thresholds based on the test results; and
generate a fingerprint tied to the UAID that verifies proper assembly.

17. The system of claim 16, the testbench further configured to generate a pass/fail message based on whether the determination of whether the hose assembly meets the one or more thresholds.

18. The system of claim 16, the testbench further configured to determine a lifespan for the hose assembly based on the test result and to provide the determined lifespan to the database.

19. The testbench system of claim 1, the hose assembly comprising a tag triggered by electromagnetic interrogation.

20. The testbench system of claim 1, wherein the usage information comprises duration of use.

* * * * *